(12) United States Patent
Chitnis et al.

(10) Patent No.: US 8,583,639 B2
(45) Date of Patent: Nov. 12, 2013

(54) METHOD AND SYSTEM USING MACHINE LEARNING TO AUTOMATICALLY DISCOVER HOME PAGES ON THE INTERNET

(75) Inventors: Upendra Chitnis, Jersey City, NJ (US); Wojciech Gryc, Thornhill (CA); Ildar Khabibrakhmanov, Syosset, NY (US); Richard D. Lawrence, Ridgefield, CT (US); Prem Melville, White Plains, NY (US); Cezar Pendus, Yarley, PA (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/033,160

(22) Filed: Feb. 19, 2008

(65) Prior Publication Data

US 2009/0210419 A1  Aug. 20, 2009

(51) Int. Cl.
*G06F 7/00* (2006.01)
*G06F 17/30* (2006.01)

(52) U.S. Cl.
USPC .......................... 707/728; 707/729; 707/731

(58) Field of Classification Search
USPC .............................. 707/728–731, 771; 706/18
See application file for complete search history.

(56) References Cited

U.S. PATENT DOCUMENTS

| | | | |
|---|---|---|---|
| 6,148,289 A * | 11/2000 | Virdy ................................ 705/8 |
| 6,189,002 B1 * | 2/2001 | Roitblat .............................. 1/1 |
| 6,694,307 B2 * | 2/2004 | Julien ............................ 707/706 |
| 6,778,986 B1 * | 8/2004 | Stern et al. .............................. 1/1 |
| 2003/0046311 A1 * | 3/2003 | Baidya et al. ................... 707/200 |
| 2003/0115189 A1 * | 6/2003 | Srinivasa et al. ................... 707/3 |
| 2005/0149507 A1 * | 7/2005 | Nye .................................. 707/3 |
| 2005/0234904 A1 * | 10/2005 | Brill et al. .......................... 707/5 |
| 2007/0073758 A1 * | 3/2007 | Perry et al. ..................... 707/102 |
| 2008/0172375 A1 * | 7/2008 | Burges et al. ...................... 707/5 |
| 2009/0099996 A1 * | 4/2009 | Stefik .............................. 706/54 |

OTHER PUBLICATIONS

Xi et al. Machine Learning Approach for Homepage Finding Task. String Processing and Information Retrieval: Lecture Notes in Computer Science, vol. 2476/2002 [online], 2002 [retrieved Dec. 11, 2010]. Retrieved from the Internet:< URL: http://www.springerlink.com/content/dtg9flj7qt1tyenh/fulltext.pdf> pp. 145-159.*

Kennedy et al. "Automatic Identification of Home Pages on the Web". Jan. 2005. HICSS '05. Proceedings of the 38th Annual Hawaii International Conference on System Sciences. 9 pages.*

* cited by examiner

*Primary Examiner* — James E Richardson
(74) *Attorney, Agent, or Firm* — F. Chau & Associates, LLC; Daniel P. Morris, Esq.

(57) ABSTRACT

A method for automatically determining an Internet home page corresponding to a named entity identified by a specified descriptor including building a trained machine-learning model, generating candidate matches from the specified descriptor, wherein each candidate match includes an Internet address, extracting content-based features from websites associated with the Internet addresses of the candidate matches, determining a model score for each candidate match based on the content-based features using the trained machine-learning model, and determining a match from among the candidate matches according to the scores, wherein the match is returned as the Internet home page corresponding to the named entity.

16 Claims, 5 Drawing Sheets

| Number | Variable Name | Description |
|---|---|---|
| 1 | titleInHtmlNormed | Checks that various key words in the company title are in the HTML code (normalized by title length). |
| 2 | titleInHtml | Checks that various key words of the company title are in the HTML code. |
| 3 | titleTagTermCountNormed | That the <title> tag contains terms of the company name (normalized by title length). |
| 4 | titleTagTermCount | That the <title> tag contains terms of the company name. |
| 5 | compSiteModelScore | Score determined by the Company Website model. |
| 6 | levDistTitleTag | Levenstein distance of the title tag to the company name. |
| 7 | levDistDomain | Levenstein distance of the domain name to the company name. |
| 8 | entireNameInHtml | Is the entire company name in the HTML code? |
| 9 | lengthOfHtml | How long is the page itself, in characters? |
| 10 | adCount | Counts the number of ads on the site. |
| 11 | nonLocalLinks | Counts the number of nonlocal links on the site. |
| 12 | entireNameInTitle | Is the entire company name in the title tag? |
| 13 | adBool | Does the page contain ads? |
| 14 | wordLocLinksRatio | Ratio of words to local links. |
| 15 | wordLinksRatio | Ratio of words to all links. |
| 16 | entireNameWithLegalInTitle | Does the entire company name (with legal identifier) appear in the <title> tag? |
| 17 | adLinksCount | Counts the number of links to ad domains on the site. |
| 18 | adLinksBool | Do links to ad domains appear? |
| 19 | metaCountNormed | Counts the number of terms from the company title in the META description, normalized by company name length. |
| 20 | metaCount | Counts the number of terms from a company's title that appear in the META description. |
| 21 | legalDescInHtml | Does the company's legal descriptor appear in the HTML? |
| 22 | nonLocalLinksNormed | Number of non-local links, normalized by all links on the page. |
| 23 | wordListBoolean | A boolean variable representing whether or not certain words from a set of words appear. The set is created through the machine learning model, and can be customized to a specific task or data set. |
| 24 | wordListCount | The number of times specific words appear from a pre-determined set of words. The word list is the same as the one used in the variable *wordListBoolean*. |
| 25 | blackListBoolean | A boolean variable representing whether words from a blacklist appear on the site. Blacklisted terms can be customized for specific tasks, such as checking for advertisements, blogs, or avoiding specific types of businesses. |
| 26 | blackListCount | Like *blackListBoolean* but counts the number of times blacklisted words appear. |

METHOD AND SYSTEM USING MACHINE LEARNING TO AUTOMATICALLY DISCOVER HOME PAGES ON THE INTERNET

BACKGROUND OF THE INVENTION

1. Technical Field

The present disclosure relates to a system and method of using machine learning to automatically discover the home page of an entity (e.g., a company, an organization, or a person) based on a specified descriptor such as the name of the entity.

2. Discussion of Related Art

It can be a challenge to discern whether a company has a website and to identify the correct home page if the company has a website. A URL (Uniform Resource Locator) is the unique address for a file that is accessible on the Internet. The term "website" (alternatively, web site or Web site) refers to a related collection of World Wide Web (WWW) files that includes a main file called a home page.

There are instances where it is useful to know the Internet home page or URL for a specified set of companies. If the companies are large, such as Fortune 500 companies, the task of finding their home pages can be accomplished by submitting each company name to an Internet search engine and selecting from returned results. This approach is less reliable for smaller companies because the returned results will not reliably include the home page address. The smaller a company's Internet presence, the more difficult it becomes to identify the home page.

Registration of Internet top-level domains is managed by the Internet Corporation for Assigned Names and Numbers (ICANN). A top-level domain (TLD), sometimes referred to as a top-level domain name (TLDN), can be registered through domain-name registrars that have been accredited by ICANN. A number of companies have been accredited by ICANN to act as registrars in one or more TLDs, including, for example, .biz, .com, .info, .net and .org.

It is known that TLD registration lists can be used to determine the home page address for a given company. Using TLD registration lists, it is possible to determine if a specified domain is currently registered, and if so, the name of the entity that registered the domain.

However, the conventional method of domain lookup can lead to incorrect results for companies with a small Internet presence. Many of these companies rely on other companies to build, host, and maintain their company websites. The company that develops the website may register the domain under their company name, rather than the name of the requesting company. For this reason, the use of domain registration data does not reliably determine a correct match of a company name to its website. For example, the company Michigan Capital Finance has a home page associated with a given domain name. If this domain name is matched to a domain registration list (there are websites that support such a query), the named registrant is an entity ZWBALLCO, which is a different company that offers website hosting services to other companies. Hence, domain lookup cannot be relied on to lead to correct results.

Therefore, a need exists for a system and method of matching an Internet home page to a specified entity.

SUMMARY OF THE INVENTION

According to an exemplary embodiment of the present invention, a method for automatically determining an Internet home page corresponding to a named entity identified by a specified descriptor including building a trained machine-learning model, generating candidate matches from the specified descriptor, wherein each candidate match includes an Internet address, extracting content-based features from websites associated with the Internet addresses of the candidate matches, determining a model score for each candidate match based on the content-based features using the trained machine-learning model, and determining a match from among the candidate matches according to the scores, wherein the match is returned as the Internet home page corresponding to the named entity.

According to an exemplary embodiment of the present invention, a program storage device readable by machine tangibly embodies a program of instructions executable by the machine to perform method steps for automatically determining an Internet home page corresponding to a named entity identified by a specified descriptor.

According to an exemplary embodiment of the present invention, a system for automatically determining an Internet home page corresponding to a specified company name includes a memory system for storing a program code and a processor in communication with the memory system, wherein the processor executes the program code to implement method steps of constructing a first training set comprising a set of potential company homepages, constructing a second training set comprising a set of potential company name, URL matches, extracting content-based features from the first training set to build a first set of extracted features and extracting content-based features from the second training set to build a second set of extracted features, training a company-website model to distinguish actual company websites from non-company pages using at least one of the first set of extracted features or the first training set, applying the trained company-website model to generate a score, training a company-match model using at least one of the score, the second set of extracted features, or the second training set, and determining if a candidate match is correct using the company-match model.

The present invention will become readily apparent to those of ordinary skill in the art when descriptions of exemplary embodiments thereof are read with reference to the accompanying drawings.

BRIEF DESCRIPTION OF THE DRAWINGS

FIG. 3 is table of exemplary features for training a machine-learning model processor, according to an exemplary embodiment of the present invention.

DESCRIPTION OF EXEMPLARY EMBODIMENTS

Hereinafter, exemplary embodiments of the present invention will be described with reference to the accompanying drawings. As used herein, the term "descriptor" refers to a word or phrase (i.e., a string of words, such as a company name), which the user might submit to a search engine to find a Web site or page.

According to an exemplary embodiment of the present invention, a system and method match specified descriptors to home pages and output matched results to a repository. Each selected home page corresponds to a most-likely correct search result (or best match) for the specified descriptor. The matched results may be stored in various tables of a database structure. In various exemplary embodiments of the present invention, the descriptor identifies businesses, organizations, public agencies, or persons.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a computer system comprising any suitable architecture.

Figure 1:
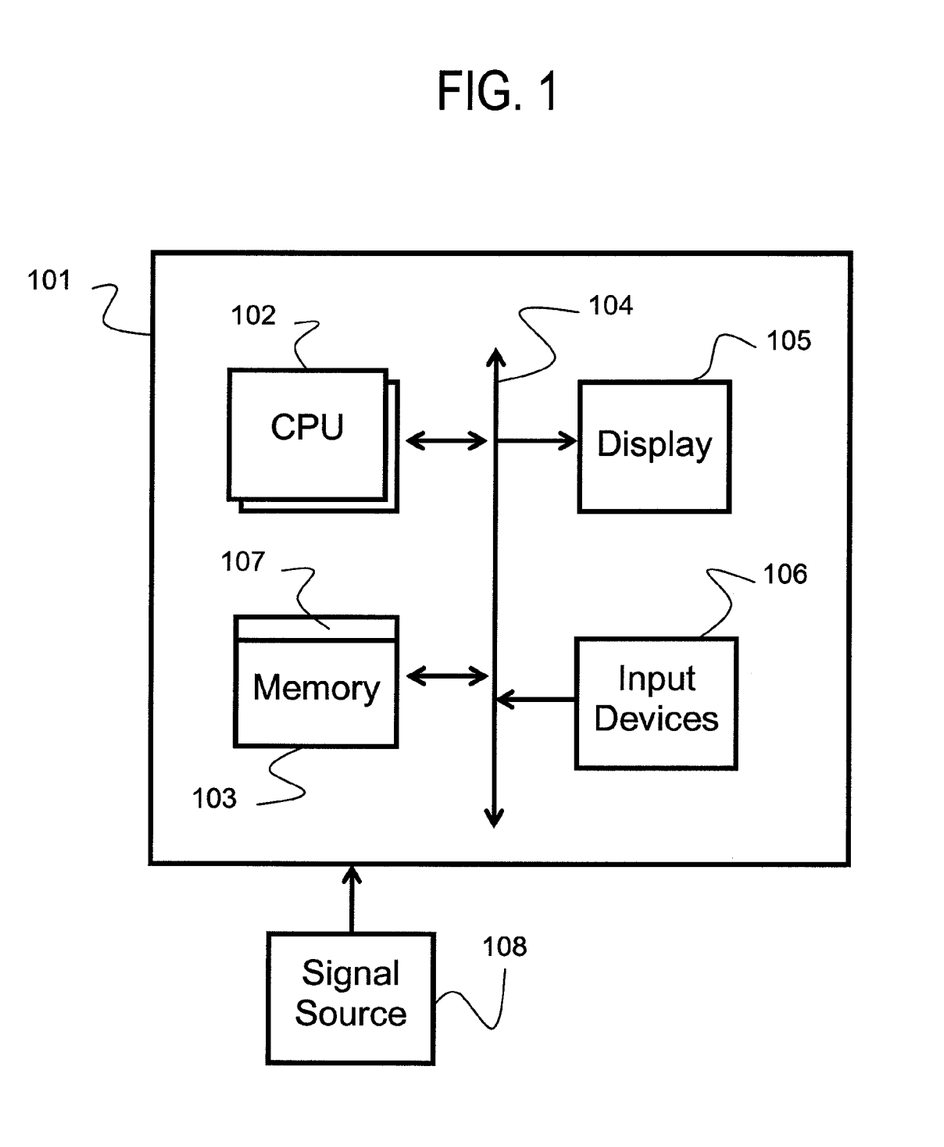
FIG. 1 is a block diagram of a data processing system, which may be used to implement an exemplary embodiment of the present invention.

Referring to FIG. 1, according to an embodiment of the present invention, a computer system 101 for implementing a method to automatically determine an Internet home page for a specified entity can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

It will be appreciated that the hardware depicted in FIG. 1 may vary depending on the implementation. Other internal hardware or peripheral devices, such as flash memory, equivalent non-volatile memory, or optical disk drives and the like, may be used in addition to or in place of the depicted hardware.

It is to be understood that a program storage device can be any computer readable storage medium that can contain or store a program of instructions for use by or in connection with an instruction execution system, apparatus or device.

The computer readable storage medium can be, for example, an electronic, magnetic, optical, electromagnetic, infrared, or semiconductor system (or apparatus or device). Examples of a computer readable storage medium include a semiconductor or solid state memory, magnetic tape, removable computer diskettes, RAM (random access memory), ROM (read-only memory), rigid magnetic disks, and optical disks such as a CD-ROM, CD-R/W and DVD. Alternatively, the program of instructions may be embodied in a propagation medium for communicating or propagating the program of instructions.

A data processing system suitable for storing and/or executing a program of instructions may include one or more processors coupled directly or indirectly to memory elements through a system bus. The memory elements can include local memory employed during execution of the program code, bulk storage, and cache memories that provide temporary storage of at least some program code to reduce the number of times code must be retrieved from bulk storage during execution.

Figure 2:
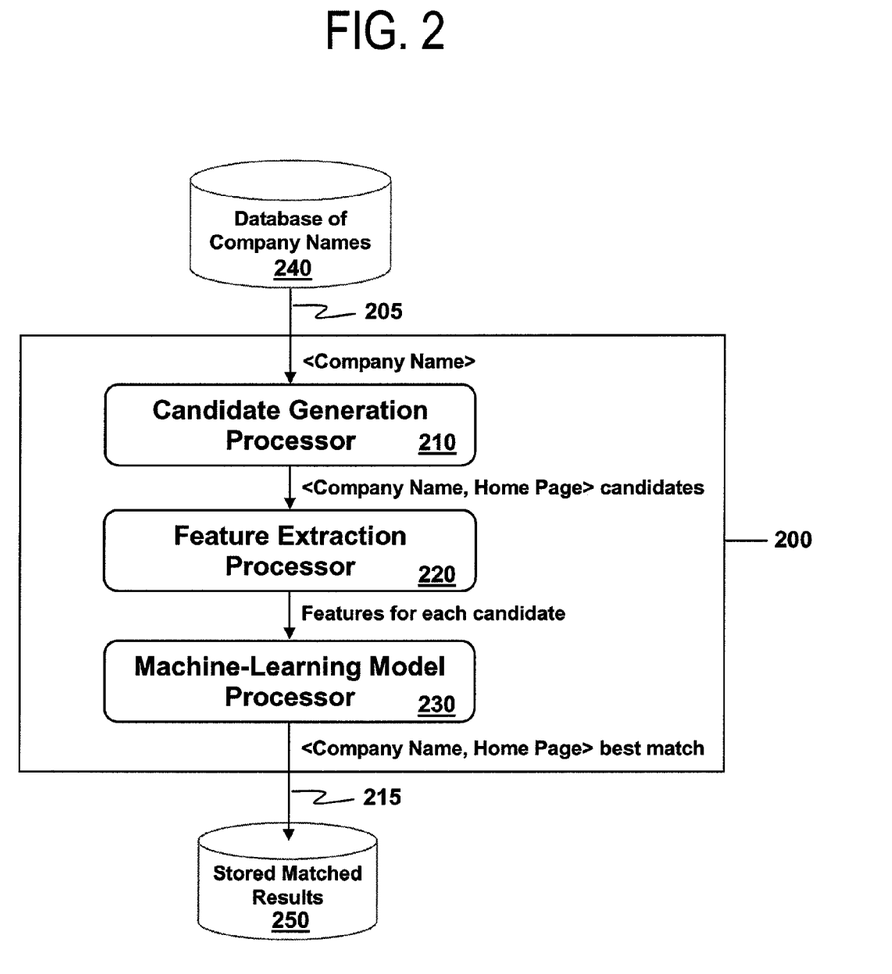
FIG. 2 is a schematic diagram of a machine-learning system for identifying a home page corresponding to a specified entity (e.g., company), according to an exemplary embodiment of the present invention.

FIG. 2 is a schematic diagram of a machine-learning system for identifying a home page corresponding to a specified descriptor, according to an exemplary embodiment of the present invention.

Referring to FIG. 2, the machine-learning system 200 includes a candidate generation processor 210, a feature extraction processor 220, and a machine-learning processor 230. The system 200 receives input 205 including a set of descriptors, such as, for example, company names. The input 205 may include various data. For example, the input 205 may include a street address of a plant or facility or company headquarters corresponding to a named company.

The system 200 may be communicatively coupled to a repository for storing the set of descriptors. For example, the set of company names may be stored in a database 240. Although one database 240 is shown in FIG. 2, it is to be understood that the machine-learning system 200 may be implemented using any number of databases. It will be appreciated that the input 205 may include data from various databases. The system 200 may include a graphical user interface (not shown). For example, the graphical user interface may allow a user to enter the input 205. The graphical user interface may enable a user to monitor operations of the system 200.

In an exemplary embodiment of the present invention, the input 205 includes a list of company names. The system 200 matches each company name to a home page, and outputs the matched results as output 215 to a repository 250. The selected home page corresponds to a most-likely correct search result (or best match) for a specified company. The matched results may be stored in various tables of a database structure. It will be appreciated that various data structures may be used to store the matched results. For example, the matched results may be stored in a linked list or other data structure.

The candidate generation processor 210 receives the input 205 that includes the set of company names. For each company name, the candidate generation processor 210 generates a preliminary set of home pages that may contain the correct match to the company name. In an exemplary embodiment of the present invention, the candidate generation processor 210 generates the preliminary set of home pages by submitting a company name to one or more Internet search engines, and automatically parsing the search-engine output to determine a set of domains that may be the home page for the submitted company name. The submission to the Internet search engine(s) may be preceded by a filtering step to eliminate semantically less-significant words (e.g., "company") or widely used abbreviations (e.g., "Inc.") from the company name.

In an exemplary embodiment of the present invention, the generation processor 210 outputs the preliminary set of homepages as potential candidate <company name, home page> matches, also referred to herein as candidates matches.

The feature extraction processor 220 receives the set of potential candidate <company name, home page>. For each candidate match, the feature extraction processor 220 generates a set of attributes or features that are relevant to predicting a correct match. For example, these features may be obtained by crawling and scraping the content of a candidate home page, and then analyzing it to determine a set of content-based attributes. Features can include, but are not limited to, (a) whether the company name appears in the title, meta-tags, or HTML code of the Web page, (b) whether terms similar to the company name appear anywhere on the site, (c) whether there are online ads on the site, etc. FIG. 3 illustrates a list of exemplary features. It will be appreciated that additional features can be used for this analysis. The set of features extracted for each candidate match are outputted to the machine-learning model processor 230.

The machine-learning model processor 230 receives the set of features for each candidate home page and generates a score for each candidate match based on analysis of the features. The processor 230 can use any classification algorithm, such as for example, a decision tree, neural network, or statistical model. It will be appreciated that different classifiers can be used without loss of generality. In an exemplary embodiment of the present invention, the score is proportional to the probability that the candidate home page is the correct match. The candidate match with the best score is selected as the best match. For example, on a scale of 0 to 1, where 0 represents the lowest probability score and 1 is the highest probability score, the candidate match with a score closest to 1 would be selected as the best match.

In an exemplary embodiment of the present invention, if no candidate match meets a preset lower threshold on the score, the system 200 returns no match for the specified company. For example, a lower threshold of 0.25 may be used in the case when the model score is a continuous output between 0 and 1. When the model score is a continuous output between 0 and 1, small variations in the lower threshold may not detrimentally affect the performance of the model. For example, in the case when the model score is a continuous output between 0 and 1 and a lower threshold of 0.25 is used, variations up to about ±0.05 in the lower threshold (i.e., 0.255 to 0.245) do not detrimentally affect the performance of the model. Training of the machine learning model processor 230 is discussed below.

Figure 4:
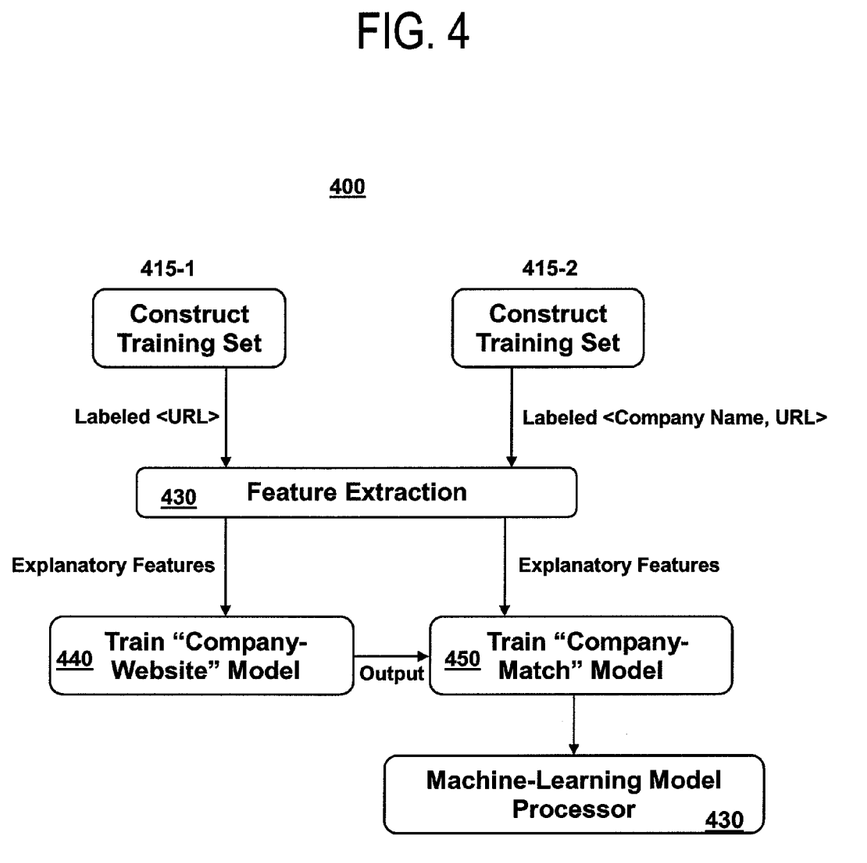
FIG. 4 is a schematic diagram showing a method of training a machine-learning system, according to an exemplary embodiment of the present invention.

FIG. 4 is a schematic diagram showing a method of training a machine-learning system, according to an exemplary embodiment of the present invention. For example, a machine-learning system may be trained to predict whether a <company name, home page> candidate is correct based on analysis of features, as described above. To train the machine-learning system, examples of <company name, home page> matches that are known to be either correct or incorrect may be used.

Referring to FIG. 4, in modules 415-1 and 415-2, training sets are constructed for the two distinct models shown in this figure. The construct training set module 415-1 specifies a set of potential company home pages that are labeled, e.g., by human experts, as either (i) home page for a company, or (ii) NOT home page for a company. Examples of class (ii) include Internet directories, such as those provided by YELLOW-PAGES.COM_LLC, that may mention the company for which a match is sought, but are not the actual home page for that company. In an exemplary embodiment of the present invention, <URL> examples are chosen for the purpose of training a model to estimate the probability that a given Internet page is indeed a home page of some (as yet unspecified) company.

The construct-training-set module 415-2 specifies a set of potential <company name, URL> matches are specified that are labeled (e.g., by human experts) as either (i) Correct or (ii) Incorrect matches. Here, examples of class (ii) include home pages that are indeed the home page for some company, but not the home page for a specified company name. In an exemplary embodiment of the present invention, <company name, URL> examples are chosen for the purpose of training a model to predict whether a potential candidate <company name, home page> match is indeed correct.

The feature extraction module 430 involves the extraction of attributes or explanatory features which are likely to help a predictive model distinguish between the classes of examples described in blocks 415-1 and 415-2. Feature extraction 430 may be embodied as the feature extraction processor 220 shown in FIG. 2. The home page of each example from blocks 415-1 and 415-2 is crawled, and attributes or features are defined based on the analysis of the content on this page. These features can include the number of words from the company name that appear on the page, in the meta-tags, and in the title. Features can include whether the page contains online ads, as well as the number of links from this page to other Internet pages.

The feature extraction module 430 may implement exemplary features described in FIG. 3. For example, the feature extraction module 430 may implement a feature named "titleInHtmlNormed" (number 1 in the table of FIG. 3) to check that various key words in the company title are in the HTML code (normalized by length) and may implement a feature named "levDistTitleTag" (number 6 in the table of FIG. 3) to determine the Levenstein distance of the title tag to the company name. For example, the Levenstein distance between two strings is given by the minimum number of operations needed to transform one string into the other, where an operation is an insertion, deletion, or substitution of a single character. Feature number 5 in the table of FIG. 3 is the model score determined by the Company Website Model (module 440 in FIG. 4). The features numbered 25 and 26 in the table of FIG. 3 introduce the concept of "blacklisted" sites that are known by human experts to always be inadmissable as company home pages. Examples of such blacklisted sites include company directories like those provided by YELLOWPAGES.COM_LLC and so on. Features 25 and 26 hence capture the likelihood that the candidate URL is a known blacklisted site.

In block 440, the predictive company-website model is trained to distinguish actual company websites from non-company pages, using the features extracted in feature extraction module 430 and the training examples defined in block 415-1. This model can be any classification algorithm, which can be applied to the features of any candidate website. For example, the company-website model may be a decision tree, neural network or statistical model.

In block 450, the predictive company-match model is trained to determine if a candidate <company name, home page> match is correct. The company-match model receives as input the output score produced by the company-website model in block 440. In addition to the score, text-based features identified by the company-website model can also be used as inputs. Such features are represented as feature numbers 23 and 24 in the table of FIG. 3. The company-match model can be any classification algorithm, such as for example, a decision tree, neural network, or statistical model. The resulting model includes an algorithm which can be applied to the features of any candidate <company name, home page> match. This algorithm may be embodied in the machine learning processor 230 shown in FIG. 2.

Figure 5:
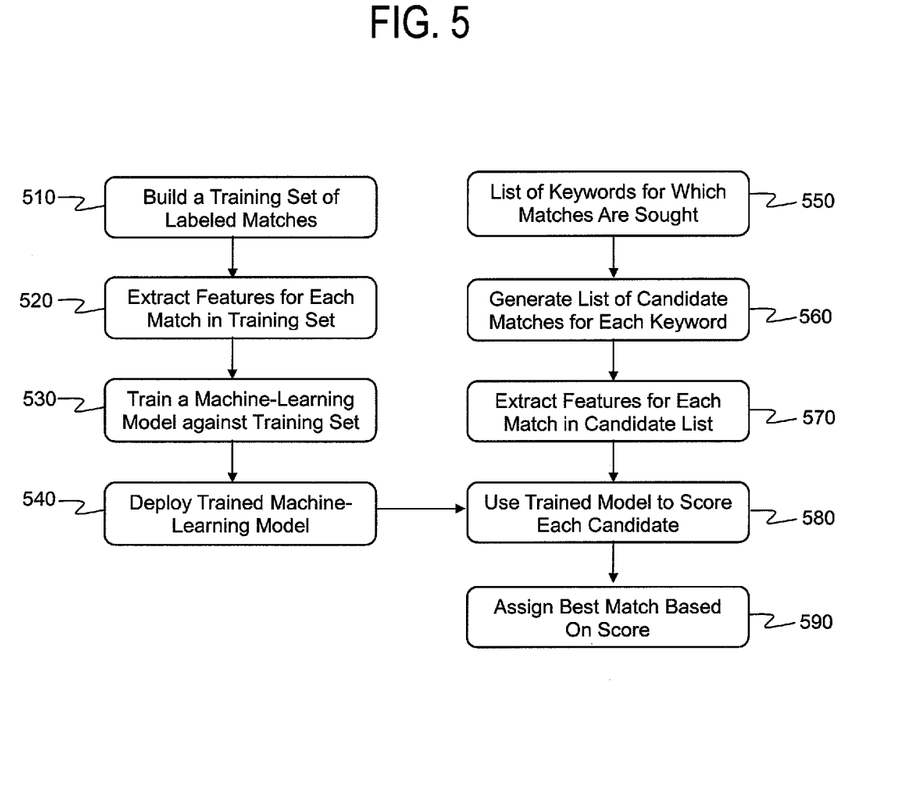
FIG. 5 is a flowchart illustrating a method to automatically determine an Internet home page corresponding to a specified descriptor, according to an exemplary embodiment of the present invention.

FIG. 5 is a flowchart illustrating a method to automatically determine an Internet home page corresponding to a specified descriptor, according to an exemplary embodiment of the present invention. In module 510, a set of training that includes pairs of labeled matches is built, wherein some pairs are known to be correct <company name, URL> matches, and others are known to be incorrect. The correct and incorrect labels may be generated by human inspection. In module 520, features are extracted for each match in the training set. For example, module 520 may be implemented using feature extraction module 430 of FIG. 4, based on the exemplary features shown in FIG. 3.

Using the features for the set of training examples, a machine-learning model is trained, in module 530. For example, the machine-learning model can be implemented using any classification algorithm. In module 580, the trained machine-learning model is deployed. For example, deploying the trained machine-learning model may include implementing the specifics of the trained model in computer code, and running this code against the features extracted in module 570.

In module 580, the trained machine-learning model is used to predict the home pages corresponding to a set of descriptors (module 550) for which Internet homepage matches are sought. The descriptors may identify entities such as businesses, organizations, public agencies, or persons. For example, the descriptors may identify company names. For each descriptor, a list of potential URL matches is generated by submitting the descriptor to an Internet search engine, and capturing the top N returns, where N=10 in the exemplary embodiment.

In module 570, features are extracted for each candidate match. For example, features may be extracted in module 570 for each candidate match using the same procedure as used in module 520 for the training set. In module 580, each of these candidate matches is evaluated (e.g., scored) by the trained model. In module 590, the candidate URL is selected as the best match to the specified company name based on score. For example, the candidate URL with the highest score may be selected as the best match to the specified company name.

In an exemplary embodiment of the present invention, a system uses machine learning to identify the Internet home page (URL) for a set of companies when only the company name is known. The system may involve training a machine-learning model to distinguish correct matches of home pages to company names, based on a large number of explanatory features characterizing the content of the candidate website. The model may be trained against labeled examples of correct and incorrect matches. The model may be applied in a system that accepts as input a large number of companies for which home pages are sought, and produces as output the most likely home page for each company in the input.

Although exemplary embodiments of the present invention have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing exemplary embodiments may be made without departing from the scope of the disclosure.

What is claimed is:

1. A method for automatically determining an Internet home page corresponding to a specified name of an entity, comprising the steps of:
    receiving a first training set comprising a set of a plurality of both positively labeled and negatively labeled potential home pages, wherein each potential homepage is associated with a respective name, wherein, for each potential homepage, a positive label indicates that the potential homepage is a homepage that belongs to the respective name and a negative label indicates that the potential homepage is a web page associated with the respective name but is not the homepage for the respective name;
    receiving a second training set comprising a set of a plurality of both positively labeled and negatively labeled name-address matches, wherein each name-address match comprises a potential name and a unique address, and wherein each name-address match is assigned a positive label when the unique address refers to a homepage of the associated potential name, or a negative label when the unique address refers to a homepage that is not associated with the potential name;
    extracting content-based features from each potential homepage from the first training set using the potential homepage and the corresponding respective name for each potential homepage to build a first set of extracted features, and extracting content-based features for each name-address match from the second training set using the potential name and the corresponding address for each name-address match to build a second set of extracted features;
    training a website model to distinguish the entity's pages from pages not associated with the entity using the first set of extracted features of the first training set;
    applying the trained website model to generate a model score for each of a plurality of pages;
    training a match model using the model scores and the second set of extracted features of the second training set to predict a homepage corresponding to the specified name of the entity from among the plurality of pages; and
    predicting and returning the homepage corresponding to the specified name of the entity using the match model.

2. The method of claim 1, wherein the entity comprises a company.

3. The method of claim 1, wherein the entity comprises an organization.

4. The method of claim 1, wherein the entity comprises a person.

5. The method of claim 1, wherein predicting a homepage corresponding to the specified name of the entity from among the plurality of pages comprises selecting the page having a highest model score.

6. The method of claim 1, wherein training the website model comprises:
    receiving the first and second training sets comprising labeled matches, wherein each labeled match has one of a positive or a negative label;
    extracting the training features for each labeled match in the first and second training sets; and
    training a website model against the training features extracted from the first and second training sets to construct the trained website model.

7. The method of claim 1, wherein training the website model comprises:
extracting content-based features from the first training set to build training features of the first training set and extracting content-based features from the second training set to build the training features of the second training set;
training a first model using at least one of the training features of the first training set; and
training a second model to determine if a candidate match is correct using the training features of the second training set.

8. The method of claim 1, wherein the model score is determined according to a decision tree, a neural network, or a statistical model.

9. The method of claim 1, wherein predicting a homepage corresponding to the specified name of the entity from among the plurality of pages comprises selecting the page having a highest model score above a specified threshold score.

10. The method of claim 1, wherein extracting the content-based features includes determining whether keywords of a specified descriptor appear in a title tag, meta-tags, or HTML code of the plurality of pages.

11. The method of claim 1, wherein extracting the content-based features includes determining a Levenstein distance of a title tag to a specified descriptor.

12. A system for automatically determining an Internet home page corresponding to a specified name of an entity, comprising:
a memory system for storing a program code; and
a processor in communication with the memory system, wherein the processor executes the program code to implement method steps of:
receiving a first training set comprising a set of a plurality of both positively labeled and negatively labeled potential homepages, wherein each potential homepage is associated with a respective name, wherein, for each potential homepage, a positive label indicates that the potential homepage is a homepage that belongs to the respective name and a negative label indicates that the potential homepage is a web page associated with the respective name but is not the homepage for the respective name;
receiving a second training set comprising a set of a plurality of both positively labeled and negatively labeled name-address matches, wherein each name-address match comprises a potential name and a unique address, and wherein each name-address match is assigned a positive label when the unique address refers to a homepage of the associated potential name, or a negative label when the unique address refers to a homepage that is not associated with the potential name;
extracting content-based features from each potential homepage from the first training set using the potential homepage and the corresponding respective name for each potential homepage to build a first set of extracted features, and extracting content-based features for each name-address match from the second training set using the potential name and the corresponding address for each name-address match to build a second set of extracted features;
training a website model to distinguish the entity's pages from pages not associated with the entity using the first set of extracted features of the first training set;
applying the trained website model to generate a model score for each of a plurality of pages;
training a match model using the model scores and the second set of extracted features of the second training set to predict a homepage corresponding to the specified name of the entity from among the plurality of pages; and
predicting and returning the homepage corresponding to the specified name of the entity using the match model.

13. The system of claim 12, wherein the match model comprises a decision tree, a neural network or a statistical model.

14. A computer readable storage medium, tangibly embodying a program of instructions executable by the computer to perform method steps for automatically determining an Internet home page, the method steps comprising:
receiving a first training set comprising a set of a plurality of both positively labeled and negatively labeled potential home pages, wherein each potential homepage is associated with a respective name, wherein, for each potential homepage, a positive label indicates that the potential homepage is a homepage that belongs to the respective name and a negative label indicates that the potential homepage is a web page associated with the respective name but is not the homepage for the respective name;
receiving a second training set comprising a set of a plurality of both positively labeled and negatively labeled name-address matches, wherein each name-address match comprises a potential name and a unique address, and wherein each name-address match is assigned a positive label when the unique address refers to a homepage of the associated potential name, or a negative label when the unique address refers to a homepage that is not associated with the potential name;
extracting content-based features from each potential homepage from the first training set using the potential homepage and the corresponding respective name for each potential homepage to build a first set of extracted features, and extracting content-based features for each name-address match from the second training set using the potential name and the corresponding address for each name-address match to build a second set of extracted features;
training a website model to distinguish the entity's pages from pages not associated with the entity using the first set of extracted features of the first training set;
applying the trained website model to generate a model score for each of a plurality of pages;
training a match model using the model scores and the second set of extracted features of the second training set to predict a homepage corresponding to the specified name of the entity from among the plurality of pages; and
predicting and returning the homepage corresponding to the specified name of the entity using the match model.

15. The storage medium of claim 14, wherein predicting a homepage corresponding to the specified name of the entity from among the plurality of pages comprises selecting the page having a highest model score above a specified threshold score.

16. The storage medium of claim 14, wherein training the website model comprises:
receiving the first and second training sets comprising labeled matches, wherein each match has one of a positive or a negative label;
extracting the training features for each match in the first and second training sets; and training a website model against the training features extracted from the first and second training sets to construct the trained website model.

* * * * *